(12) United States Patent
Spiessberger et al.

(10) Patent No.: US 11,579,251 B2
(45) Date of Patent: Feb. 14, 2023

(54) COAXIAL LIDAR SYSTEM

(71) Applicant: Robert Bosch GmbH, Stuttgart (DE)

(72) Inventors: Stefan Spiessberger, Weinstadt (DE); Frederik Ante, Ludwigsburg (DE); Mazyar Sabbar, Zurich (CH)

(73) Assignee: Robert Bosch GmbH, Stuttgart (DE)

(*) Notice: Subject to any disclaimer, the term of this patent is extended or adjusted under 35 U.S.C. 154(b) by 916 days.

(21) Appl. No.: 16/439,882

(22) Filed: Jun. 13, 2019

(65) Prior Publication Data

US 2019/0383908 A1 Dec. 19, 2019

(30) Foreign Application Priority Data

Jun. 13, 2018 (DE) .......................... 102018209394.6

(51) Int. Cl.
*G01S 7/481* (2006.01)

(52) U.S. Cl.
CPC .......... *G01S 7/4812* (2013.01); *G01S 7/4817* (2013.01)

(58) Field of Classification Search
CPC .............................. G01S 7/4812; G01S 7/4817
See application file for complete search history.

(56) References Cited

U.S. PATENT DOCUMENTS

| | | | |
|---|---|---|---|
| 2016/0084945 A1* | 3/2016 | Rodrigo | G01S 7/4917 356/5.01 |
| 2017/0269215 A1 | 9/2017 | Hall et al. | |
| 2019/0271821 A1* | 9/2019 | Moebius | G01S 7/4816 |

FOREIGN PATENT DOCUMENTS

DE 102017124535 A1 4/2019

* cited by examiner

*Primary Examiner* — Girumsew Wendmagegn
(74) *Attorney, Agent, or Firm* — Norton Rose Fulbright US LLP; Gerard Messina

(57) ABSTRACT

A coaxial LiDAR system having a reduced adjustment complexity and reduced installation space includes a transmitter unit designed to emit LiDAR radiation, a receiver unit designed to detect incident LiDAR radiation, and an optical system for imaging LiDAR radiation, the radiation emitted by the transmitter unit and the radiation from the optical system incident upon the receiver unit being transmitted in collinear form, the emitting surface of the transmitter unit being situated outside of the focus of the imaging optical system.

12 Claims, 4 Drawing Sheets

Stand der Technik

COAXIAL LIDAR SYSTEM

CROSS-REFERENCE TO RELATED APPLICATIONS

The present application claims priority under 35 U.S.C. § 119 to DE 10 2018 209 394.6, filed in the Federal Republic of Germany on Jun. 13, 2018, the content of which is hereby incorporated by reference herein in its entirety.

FIELD OF THE INVENTION

The present invention relates to a coaxial LiDAR system, in particular having a reduced adjustment complexity and reduced installation space.

BACKGROUND

Existing LiDAR systems are generally designed to be biaxial. This means that both the transmitter unit and the receiver unit have their own lens systems for optical imaging. In these systems, it is necessary to align the transmitter unit very precisely with respect to the receiver unit, so that the radiation reflected by an external object can be bundled by the receiving optical system onto a corresponding detector and not pass by it. In particular, when multiple channels must be adjusted, this means a significant effort in adjustment. Furthermore, biaxial structures require a sufficiently large installation space because of their optical system being separated spatially from one another.

In addition to biaxial systems, coaxial systems are also known. The challenge here is to separate the transmission path from the reception path without experiencing any significant restrictions in system performance. Approaches in this regard use beam splitters, aperture mirrors or similar methods, among other things. However, such systems also require a precise alignment and adjustment of the individual components. Furthermore, the minimum installation space required is also limited due to the required separation between the incident radiation and the emitted radiation.

The laser beam emitted by a LiDAR system is generally shaped by optical systems. The transmission optical system is mostly positioned for this purpose in such a way that the least possible beam divergence (defining the spatial resolution of the LiDAR system) of the emitted beam is achieved. This is the case in particular when the beam is collimated. In the case of a simple lens, this means that the distance between the lens and the laser source of the transmitter unit corresponds exactly to the focal length of the lens.

If the light backscattered from an external object (so-called useful beam) is collected by the same optical system in the case of a coaxial system, it is essentially imaged again directly on the laser facet. The beam therefore cannot be detected since the receiver cannot be placed in the beam without covering the emitted beam. Inside such a LiDAR system, the transmitted beam and the received beam essentially coincide (see FIG. 1).

SUMMARY

According to the present invention, a coaxial LiDAR system is provided which can be used in particular in motor vehicles for detecting surroundings.

According to an example embodiment, a LiDAR system includes a transmitter unit designed to emit LiDAR radiation, a receiver unit designed to detect incident LiDAR radiation, and an optical system for imaging LiDAR radiation, the radiation emitted by the transmitter unit and the radiation incident on the receiver unit being transmitted in collinear form by the optical system, the emitting surface of the transmitter unit being situated outside of the focus of the imaging optical system. The distance from the emitting surface of the transmitter unit to the optical system in particular can be larger or smaller than the focal length of the optical system. In addition, the distance of the detection surface of the receiver unit from the optical system can be larger or smaller than the focal length of the optical system. The distance of the detection surface of the receiver unit from the optical system preferably corresponds to the focal length of the optical system.

The optical system assumes an imaging function or a beam-shaping function in both the transmission path and reception path. However, in contrast with traditional coaxial LiDAR systems, the emitting surface of the transmitter unit is situated outside of the focus of the imaging optical system. This means that the radiation emitted by the emitting surface of the transmitter unit is not collimated by the imaging optical system and therefore is emitted into the surroundings at least in a slightly defocused manner. Therefore the light scattered back on an external object is no longer imaged on a laser facet of the transmitter unit, for example. The image plane of the receiving path is therefore outside of the emitting surface of the transmitter unit.

In other words, the present invention describes, for example, an arrangement in which a beam-shaping optical system of a coaxial system is positioned in such a way that the focus of the received signal does not exactly strike the emission surface of the laser. This defocusing can preferably take place through the change in focal length, through a displacement of the lens along the beam propagation axis or through the adaptation of the lens parameters for intentional creation of an imaging error.

The transmitter unit can preferably include an edge emitter, a surface emitter, a fiber laser or a solid state laser as the radiation source. The transmission path of the LiDAR system has its origin on the emitting surface of the respective radiation source. Depending on the radiation source, it can be in particular a facet, a fiber end, or a general laser exit surface.

The receiver unit can include a photodiode as the detector, preferably an avalanche photodiode (APD) or a single photon avalanche diode (SPAD). The receiving path ends accordingly on the detection surface of the respective detector, i.e., on the respective active surface of the detector (detector surface).

In general, the optical system can be an imaging optical system or a beam-shaping optical system. This can preferably be designed as a single lens or as a lens system (objective). The optical system with a collinear structure projects the LiDAR radiation generated by the transmitter unit into the surroundings (transmit path) as well as collects the radiation backscattered by objects in the surroundings and imaging it on the receiver unit (receive path).

The respective distance of the transceiver unit from the optical system is established on the basis of the length of the corresponding optical path and/or path section between the aforementioned components. The paths can run in a straight line or their length and/or direction can be altered by additional optical aids.

The respective active surfaces of the transmitter unit and the receiver unit are preferably positioned at a relatively short distance from one another, so that, on the one hand, preferably little light passes by the detector and, on the other hand, the defocusing (which is associated with the resolution of the LiDAR system via the emitted divergence) is reduced as little as possible. However, if the transmit path is defocused too much, then the respective active surfaces of the transmitter unit and the receiver unit can be a greater distance apart from one another but the resolution and the optical efficiency of the LiDAR system are reduced due to the greater divergence.

Example embodiments of the present invention provide for implementation of a coaxial LiDAR system in which there is beam shaping on the transmission end and bundling of the received light on the reception end by a shared optical system (for example, an objective or lens system, single lens). This optical system is designed or positioned in such a way that a signal (useful light, reflection of an object) backscattered from the surroundings is not focused exactly on the emission surface of a laser of the transmitter optical system, for example, but instead is focused in the vicinity thereof. This intentional defocusing makes it possible to detect the received signal without thereby blocking the emitted beam. The defocusing can preferably take place by the change in focal length, by a shift of the lens along the joint beam propagation axis or by adjustment of the lens parameters for intentional creation of an imaging error.

The separation between the incident radiation and the emitted radiation, which is required in coaxial LiDAR systems, is therefore simplified according to the present invention by the fact that the image plane in the reception path remains accessible for detection of the incident radiation due to the defocusing in the transmission path. Furthermore, the requirements of the adjustment precision of the transmit path in the system structure are reduced by the defocusing. In a coaxial system according to the present invention, the adjustment of the transmitter relative to the receiver can therefore be implemented very easily and precisely from the manufacturing point of view. In addition, the installation space can be reduced substantially by this arrangement in comparison with traditional coaxial systems since no additional deflections or dimming in the beam path is necessary. The minimum installation space predefined by the focal length of the optical system is influenced only by the defocusing of the transmitter unit.

The detection surface of the receiver unit is preferably situated in the focus of the optical system. This corresponds to a focused detection in the receiver unit. Alternatively, the detection surface of the receiver unit can also be arranged outside of the focus of the optical system. In this case, both the transmitter unit and the receiver unit are defocused with respect to the focal length of the imaging or beam-shaping optical system. For correction of possible imaging errors in the reception path, the LiDAR system preferably includes means for numerical correction of the defocusing in the detected signal. Defocusing can be segregated from the received signal via the means for numerical correction, among other things.

It is preferable for the distance between the emitting surface of the transmitter unit and the optical system to be greater or smaller than the distance between the detection surface of the receiver unit and the optical system. Alternatively, the distance between the emitting surface of the transmitter unit and the optical system can be equal to the distance between the detection surface of the receiver unit and the optical system. In this way, the ratio of the distance of the emitting surface of the transmitter unit and the detection surface of the receiver unit is established at a point in the optical system. In particular, in the case of a straight-line transmit and receive path, the reception unit (i.e., its detection surface) can preferably be situated in front of or behind the transmitter unit (i.e., its emitting surface). Depending on the available installation space, an optimum approach with respect to resolution, sharpness of imaging, and size of installation space can be selected through the freedom in arranging the individual components.

The detection surface of the receiver unit is preferably larger than the emitting surface of the transmitter unit. A large detection surface has an advantage in particular that the resolution of the LiDAR system can be increased and noise can be reduced. A small emitting surface of the transmitter unit however is advantageous to minimize the size of the transmitter unit so that the receive path is preferably not disturbed by the transmitter unit in the collinear arrangement.

The detection surface of the receiver unit can preferably include a passband for transmission of LiDAR radiation. This can be in particular an opening in the detection surface or in the receiver unit. The passband can be used to transmit LiDAR radiation coming from the transmitter unit through the detection surface in the direction of the optical system.

The receiver unit can include one or multiple detectors at different spatial positions. The detection surface is obtained as the sum of the individual detector surfaces (effective detector surface). The detection surface can form a single cohesive surface, for example, or it is made up at least partially of multiple non-cohesive individual surfaces. Several individual detectors are preferably positioned laterally around a transmitter unit. A circular detector geometry enclosing the transmitter unit is also possible. An advantage of a possible breakdown of the detection surface into individual surfaces lies within the free designability of its arrangement. In particular, this can make it possible for a detection to utilize the available installation space preferably extensively.

The optical path from the transmitter unit to the optical system (transmit path) preferably includes a deflecting device and/or an intermediate optical system. It is also preferred that the optical path from the optical system to the receiver unit (receive path) includes a deflection device and/or an intermediate optical system. A deflection device can be a mirror for deflecting the respective path in particular. For example, the receive path can be deflected by a mirror onto a detector placed at another location. The receive path could be deflected laterally, for example, by a very small mirror arranged in front of or behind the focus of the imaging optical system. An intermediate optical system can include a single lens or a lens system (objective). Further imaging, a correction of optical errors, or a lengthening/shortening of the optical path can be achieved by an intermediate optical system in the respective path. In particular, the receive path can be focused once again with one lens (or a curved mirror surface). The LiDAR system can be optimally adapted to the available installation space using a deflecting device. An intermediate optical system allows in particular an improvement in the optical properties or a simple spatial shift of a component with respect to a position that would otherwise be optically preferred.

An edge emitter for generating the LiDAR radiation is preferably used in the transmitter optical system. Edge emitters emit radiation having different properties in a fast axis and a slow axis with regard to geometry, divergence, and beam quality. Since round beams are preferred for LiDAR applications, a slight defocusing can also be used at the same time for approximating the two axes.

Example embodiments in which the transmitter unit (in particular a laser) and the reception unit (in particular one or multiple detectors) are situated on a shared circuit board are particularly advantageous. The system according to the present invention can preferably include a scanning mechanism (mirror, rotating all components) to be able to scan or detect a larger area of surroundings.

Example embodiments of the present invention are explained in greater detail on the basis of the drawings and the following description.

DETAILED DESCRIPTION

Figure 1:
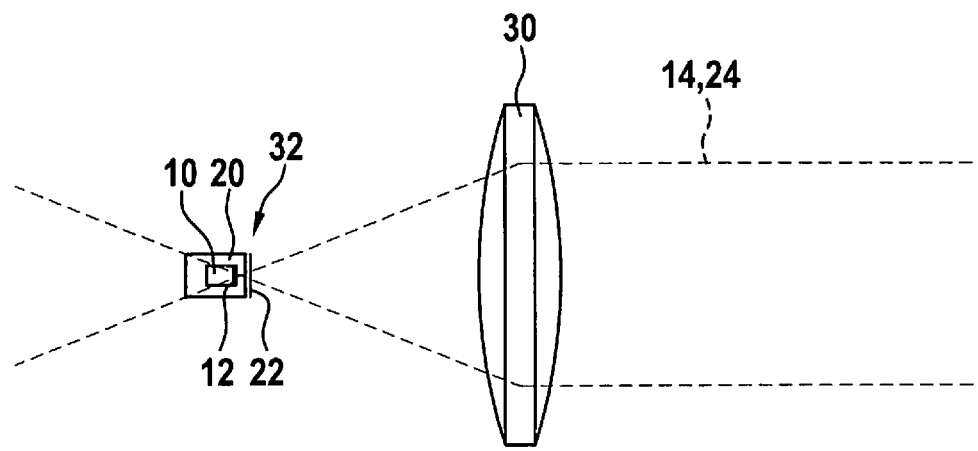
FIG. 1 is a schematic diagram of a LiDAR system according to the related art.

FIG. 1 shows a schematic diagram of a LiDAR system according to the related art. The illustrated LiDAR system includes a transmitter unit 10 designed to emit LiDAR radiation, a receiver unit 20 designed to detect incident LiDAR radiation, and an optical system 30 for imaging LiDAR radiation, the radiation (emitted beam 14) emitted by transmitter unit 10 (i.e., by emitting surface 12) and the radiation (received beam 24) incident upon receiver unit 20 (i.e., detection surface 24) being transmitted in collinear form by optical system 30, emitting surface 12 of transmitter unit 10 and detection surface 24 of receiver unit 20 both being arranged within or in the immediate vicinity of focus 32 of imaging optical system 30.

Emitted beam 14 is emitted with the smallest possible divergence at the respective beam diameter. Focus 32 of received beam 24 is exactly at emitting surface 12 of transmitter unit 10 (for example, on the exit facet of an edge-emitting laser diode). Receiver unit 20 (for example, including a detector) could not be introduced into received beam 24 in this case without at least partially blocking emitted beam 14.

Figure 2:
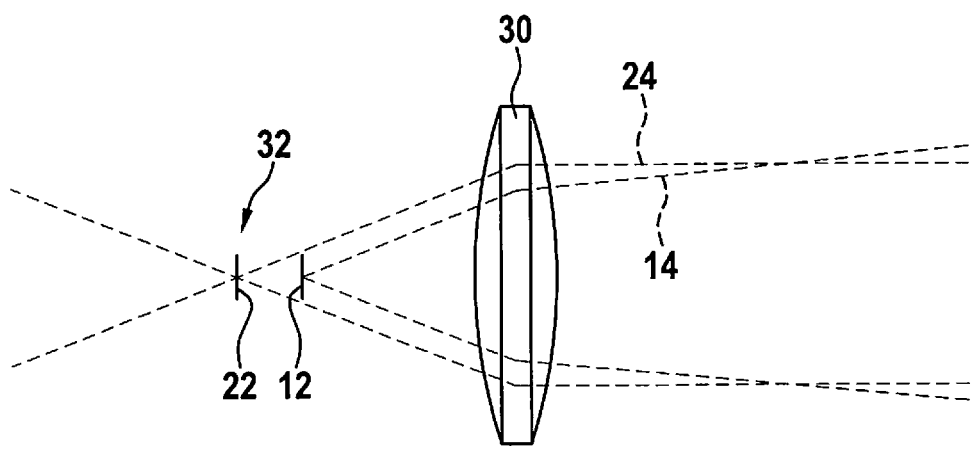
FIG. 2 is a schematic diagram of a LiDAR system according to an example embodiment of the present invention.

FIG. 2 shows a schematic diagram of a first example embodiment of a LiDAR system according to the present invention. The illustrated LiDAR system includes a transmitter unit 10 designed to emit LiDAR radiation, a receiver unit 20 designed to detect incident LiDAR radiation, and an optical system 30 for imaging LiDAR radiation, the radiation (emitted beam 14) emitted by transmitter unit 10 (i.e., by emitting surface 12) and incident radiation (received beam 24), which is incident on receiver unit 20 (i.e., on detection surface 24), being transmitted in collinear form by optical system 30, emitting surface 12 of transmitter unit 10 being situated outside of focus 32 of imaging optical system 30.

In this example embodiment, the distance of emitting surface 12 of transmitter unit 10 from optical system 30 is smaller than the focal length of the optical system in particular. Detection surface 22 of receiver unit 20 is situated in focus 32 of optical system 30. The distance between emitting surface 12 of transmitter unit 10 and optical system 30 is smaller than the distance between detection surface 22 of receiver unit 20 and optical system 30.

Transmitter unit 10 and receiver unit 20 are not shown explicitly in this and the following figures, but their relative arrangement with respect to the corresponding active surface can be derived from FIG. 1 accordingly. Any reference to transmitter unit 10 or receiver unit 20 is therefore to be equated with a reference to emitting surface 12 and detection surface 24.

Emitted beam 14 is emitted with a relatively great divergence. Focus 32 of received beam 24 is situated behind emitting surface 12 of transmitter unit 10.

Figure 3:
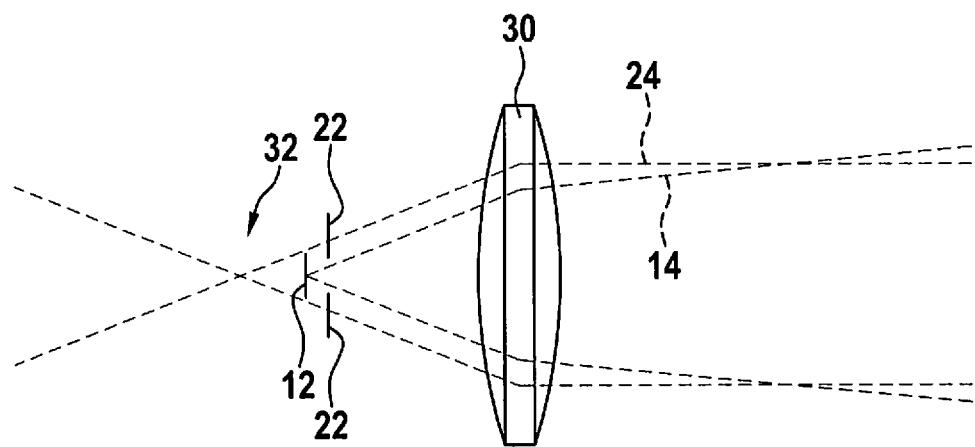
FIG. 3 is a schematic diagram of a LiDAR system according to a second example embodiment of the present invention.

FIG. 3 is a schematic diagram of a second example embodiment of a LiDAR system according to the present invention. The arrangement shown here corresponds largely to the one in FIG. 2.

However, detection surface 22 of receiver unit 20 here is situated outside of focus 32 of optical system 30, the distance of emitting surface 12 of transmitter unit 10 from optical system 30 being smaller than the focal length of optical system 30. The distance of detection surface 22 of receiver unit 20 is also smaller than the focal length of optical system 30. In addition, the distance between emitting surface 12 of transmitter unit 10 and optical system 30 is greater than the distance between detection surface 22 of receiver unit 20 and optical system 30.

Emitted beam 14 is emitted with a relatively great divergence. Focus 32 of received beam 24 is situated behind emitting surface 12 of transmitter unit 10. Detection surface 22 of receiver unit 20 is definitely larger than emitting surface 12 of transmitter unit 10. Detection surface 22 of receiver unit 20 additionally includes a passband for transmission of LiDAR radiation. Detection surface 22 can be in particular multiple individual detectors positioned laterally around a transmitter unit 10, detection surface 22 of receiver unit 20 resulting from an arrangement of a plurality of individual detectors or a circular detector geometry which encloses transmitter unit 10.

Figure 4:
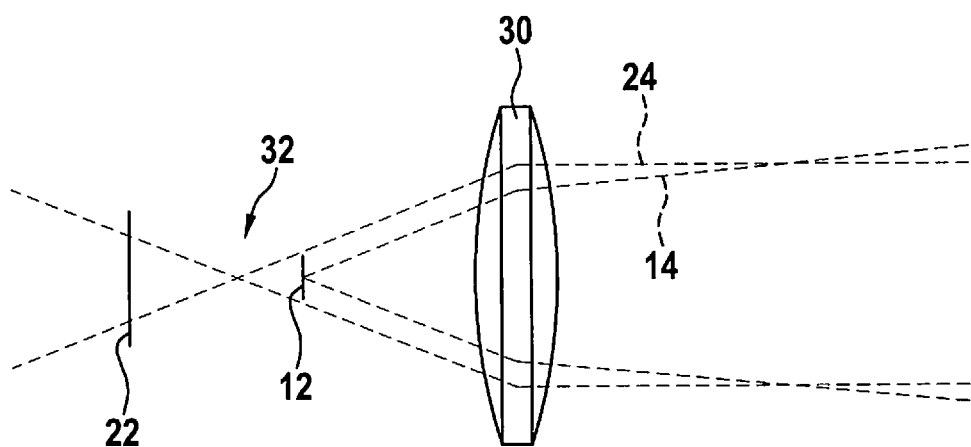
FIG. 4 is a schematic diagram of a LiDAR system according to a third example embodiment of the present invention.

FIG. 4 is a schematic diagram of a third example embodiment of a LiDAR system according to the present invention. In this example embodiment in particular, the distance of emitting surface 12 of transmitter unit 10 from optical system 30 is smaller than the focal length of the optical system. The distance of detection surface 22 of receiver unit 20 is greater than the focal length of optical system 30. The distance between emitting surface 12 of transmitter unit 10 and optical system 30 is smaller than the distance between detection surface 22 of receiver unit 20 and optical system 30.

Figure 5:
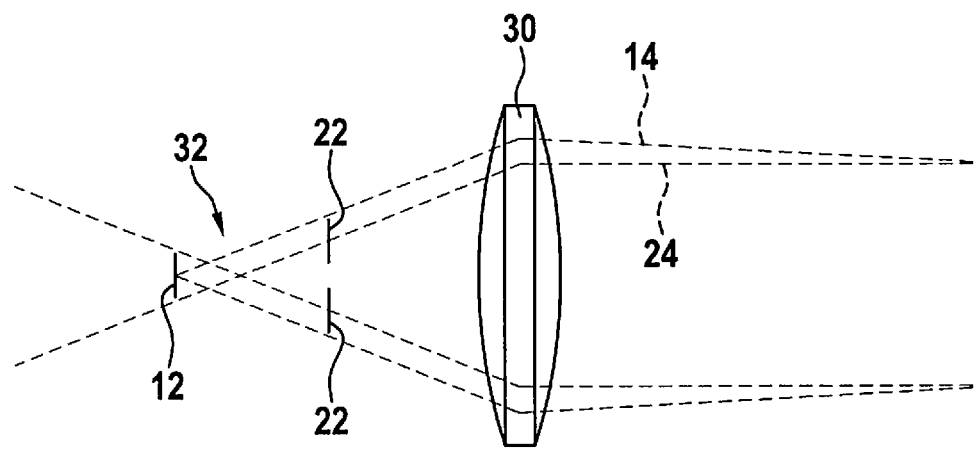
FIG. 5 is a schematic diagram of a LiDAR system according to a fourth example embodiment of the present invention.

FIG. 5 shows a schematic diagram of a fourth example embodiment of a LiDAR system according to the present invention. In this example embodiment in particular, the distance of emitting surface 12 of transmitter unit 10 from optical system 30 is greater than the focal length of the optical system. The distance of detection surface 22 of receiver unit 20 from optical system 30 is smaller than the focal length of optical system 30. The distance between emitting surface 12 of transmitter unit 10 and optical system 30 is greater than the distance between detection surface 22 of receiver unit 20 and optical system 30.

Figure 6:
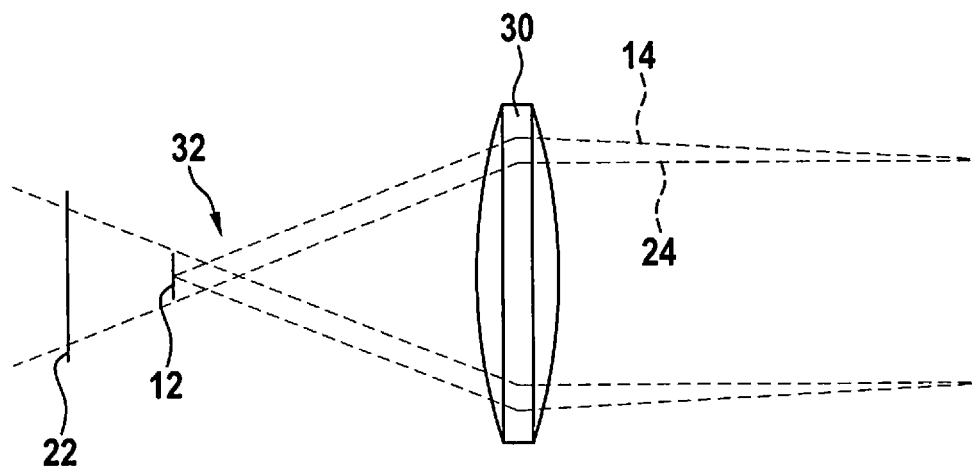
FIG. 6 is a schematic diagram of a LiDAR system according to a fifth example embodiment of the present invention.

FIG. 6 shows a schematic diagram of a fifth example embodiment of a LiDAR system according to the present invention. In this example embodiment in particular, the distance of emitting surface 12 of transmitter unit 10 from optical system 30 is greater than the focal length of optical system 30. The distance of detection surface 22 of receiver unit 20 is also greater than the focal length of optical system 30. The distance between emitting surface 12 of transmitter unit 10 and optical system 30 is smaller than the distance between detection surface 22 of receiver unit 20 and optical system 30.

Figure 7:
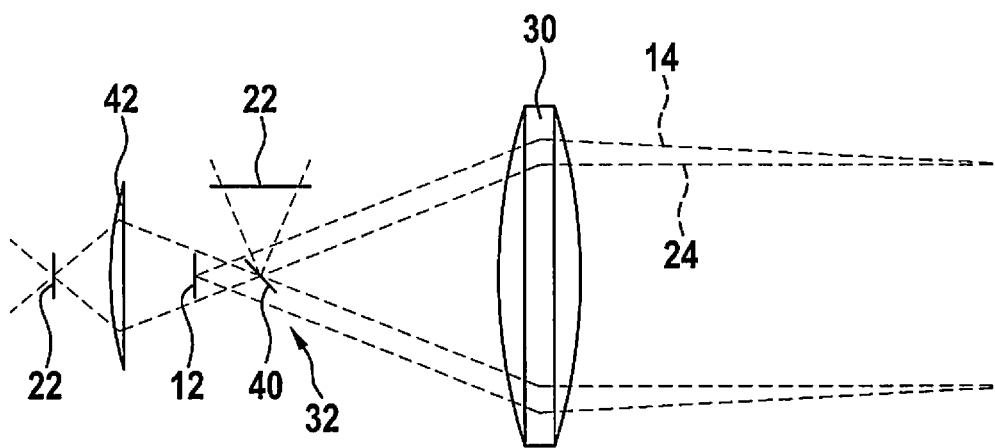
FIG. 7 is a schematic diagram of a LiDAR system according to a sixth example embodiment of the present invention.

FIG. 7 shows a schematic diagram of a sixth example embodiment of a LiDAR system according to the present invention. It shows as an example how the optical path from optical system 30 to receiver unit 20 can be altered by a deflecting device 40 and an intermediate optical system 42. In this example embodiment in particular, a deflecting device 40 (a mirror, for example) for deflecting received beam 24 is situated in focus 32. In addition, use of an intermediate optical system 42 for refocusing is also shown. The distance of emitting surface 12 of transmitter unit 10 from optical system 30 and the distance of detection surfaces 22 of receiver units 20 are greater than the focal length of optical system 30. The distance between emitting surface 12 of transmitter unit 10 and optical system 30 is smaller than the distance between detection surfaces 22 of receiver units 20 and optical system 30.

What is claimed is:

1. A LiDAR system, comprising:
   a transmitter including an emitting surface, wherein the transmitter is configured to emit LiDAR radiation via the emitting surface;
   a receiver configured to detect incident LiDAR radiation; and
   an optical system configured to transmit in collinear form the radiation emitted by the transmitter and the radiation incident upon the receiver;
   wherein the emitting surface of the transmitter is situated outside of a focus of the optical system, and
   wherein a plane of at least one detection surface of the receiver lies along a longitudinal axis, which is perpendicular to the detection surface and the emitting surface, and wherein the emitting surface of the transmitter lies along the longitudinal axis, which is perpendicular to the plane of the at least one detection surface and the emitting surface.

2. The LiDAR system of claim 1, wherein the at least one detection surface of the receiver is situated at the focus of the optical system.

3. The LiDAR system of claim 1, wherein the at least one detection surface of the receiver is situated outside of the focus of the optical system.

4. The LiDAR system of claim 1, wherein a distance between the emitting surface and the optical system is greater or smaller than a distance between the at least one detection surface of the receiver and the optical system.

5. The LiDAR system of claim 1, wherein a distance between the emitting surface and the optical system is equal to a distance between the at least one detection surface of the receiver and the optical system.

6. The LiDAR system of claim 1, wherein the at least one detection surface of the receiver is larger than the emitting surface of the transmitter.

7. The LiDAR system of claim 6, wherein the at least one detection surface includes a passband for transmission of LiDAR radiation.

8. The LiDAR system of claim 6, wherein the at least one detection surface includes a plurality of detection surfaces of a plurality of individual detectors.

9. The LiDAR system of claim 1, wherein an optical path from the transmitter to the optical system includes a deflecting device.

10. The LiDAR system of claim 1, wherein an optical path from the transmitter to the optical system includes an intermediate optical system.

11. The LiDAR system of claim 1, wherein the optical path from the optical system to the receiver includes a deflecting device.

12. The LiDAR system of claim 1, wherein the optical path from the optical system to the receiver includes an intermediate optical system.

* * * * *